# (12) United States Patent
Cooper et al.

(10) Patent No.: US 10,293,860 B1
(45) Date of Patent: May 21, 2019

(54) ROCKER WITH INTERNAL CRUSH PODS

(71) Applicant: Ford Global Technologies, LLC, Dearborn, MI (US)

(72) Inventors: Geoffrey John Cooper, Canton, MI (US); Paul Kenneth Dellock, Southgate, MI (US); Sagar Ashok Dhond, Southgate, MI (US); AmirReza Latif, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/871,502

(22) Filed: Jan. 15, 2018

(51) Int. Cl.
| | |
|---|---|
| *B62D 21/15* | (2006.01) |
| *B62D 25/02* | (2006.01) |
| *B62D 25/04* | (2006.01) |
| *B60L 3/00* | (2019.01) |
| *B62D 27/04* | (2006.01) |
| *B60K 1/04* | (2019.01) |

(52) U.S. Cl.
CPC .......... *B62D 21/157* (2013.01); *B60L 3/0007* (2013.01); *B62D 25/025* (2013.01); *B62D 25/04* (2013.01); *B62D 27/04* (2013.01); *B60K 2001/0438* (2013.01)

(58) Field of Classification Search
CPC .... B62D 21/157; B62D 27/04; B62D 25/025; B62D 25/04; B60L 3/0007; B60K 2001/0438
USPC .......................................................... 296/209
See application file for complete search history.

(56) References Cited

U.S. PATENT DOCUMENTS

| | | | | |
|---|---|---|---|---|
| 7,594,691 B2* | 9/2009 | Koormann | ........... | B62D 21/157 296/187.12 |
| 8,113,572 B2* | 2/2012 | Mildner | ............... | B62D 21/157 296/209 |
| 8,579,362 B2* | 11/2013 | Di Modugno | .......... | B60R 19/34 293/133 |
| 8,696,051 B2* | 4/2014 | Charbonneau | ....... | B62D 21/157 296/187.12 |
| 9,033,404 B2* | 5/2015 | Meaige | ................ | B62D 29/002 296/193.06 |
| 9,981,699 B2* | 5/2018 | Ayuzawa | ............. | B62D 21/157 |

(Continued)

FOREIGN PATENT DOCUMENTS

| | | |
|---|---|---|
| DE | 102013004852 A1 | 9/2014 |
| WO | 2008056073 A1 | 5/2008 |

*Primary Examiner* — Pinel E Romain
(74) *Attorney, Agent, or Firm* — Vichit Chea; Brooks Kushman P.C.

(57) ABSTRACT

A rocker assembly for a vehicle includes an outer panel and a side sill secured to the outer panel and defining a cavity with the outer panel. The rocker assembly further includes an attachment assembly including a mounting plate secured to the side sill and a mounting guide secured to the mounting plate. The mount guide includes a side rail that extends within the cavity. The rocker assembly further includes an insert pod disposed within the cavity and secured to the attachment assembly. The insert pod includes a plurality of interconnected walls defining a plurality of transversely extending open cells. The insert pod further includes a slot region extending through a side wall and sized to receive a portion of the mounting guide. The insert pod further includes guide channels walls extending from the side wall and defining a guide channel sized to receive the side rail therein.

20 Claims, 5 Drawing Sheets

(56) References Cited

U.S. PATENT DOCUMENTS

| | | | |
|---|---|---|---|
| 2010/0231002 A1* | 9/2010 | Yoshioka | B62D 21/157 |
| | | | 296/187.12 |
| 2012/0153682 A1 | 6/2012 | Rawlinson et al. | |
| 2013/0088045 A1 | 4/2013 | Charbonneau et al. | |
| 2016/0272249 A1 | 9/2016 | Yang et al. | |
| 2017/0210427 A1 | 7/2017 | Akhlaque-e-rasul et al. | |
| 2018/0065677 A1* | 3/2018 | Tutzer | B62D 21/03 |
| 2018/0065678 A1* | 3/2018 | Tutzer | F16F 7/122 |

\* cited by examiner

ROCKER WITH INTERNAL CRUSH PODS

TECHNICAL FIELD

This disclosure relates generally to a vehicle structure, and more particularly to a side structure having internal energy absorbing members.

BACKGROUND

Rocker assemblies are often provided between the front and rear wheel wells and below the doors of a vehicle to provide resistance to intrusion into the passenger compartment, or to protect a battery in an electrified vehicle, in side impact collisions. Rocker assemblies may include an outer rocker panel that is joined to a side sill.

Vehicle strengthening members may be used to increase load carrying capacity, impact energy absorption, and bending resistance while reducing mass per unit length of the strengthening member. When a compressive force is exerted longitudinally on a strengthening member (for example, a force due to a side impact load on a vehicle's side rocker rail or other member), the strengthening member may crush in a longitudinal direction to absorb the energy of the collision. In addition, when a bending force is exerted on a strengthening member (for example, a force due to a side impact load on a vehicle's front side sill, B-pillar or other strengthening member), the strengthening member may bend to absorb the energy of the collision.

SUMMARY

In at least one approach, a rocker assembly for a vehicle is provided. The rocker assembly may include an outer panel and a side sill secured to the outer panel and defining a cavity with the outer panel. The rocker assembly may further include an attachment assembly including a mounting plate secured to the side sill and a mounting guide secured to the mounting plate. The mount guide may include a side rail that extends within the cavity. The rocker assembly may further include an insert pod disposed within the cavity and secured to the attachment assembly. The insert pod may further include a plurality of interconnected walls defining a plurality of transversely extending open cells. The insert pod may further include a slot region extending through a side wall and sized to receive a portion of the mounting guide. The insert pod may further include guide channels walls extending from the side wall and defining a guide channel sized to receive the side rail therein.

In at least one approach, an insert assembly for a vehicle rocker is provided. The insert assembly may include an insert pod, a mounting guide, and a mounting plate. The insert pod may define a plurality of hollow cells and a guide channel defining a slot region extending through a side wall. The mounting guide may define a body extending into the slot region and a side rail disposed within the guide channel. The mounting plate may define a plurality of metallic flanges extending generally orthogonally from the body.

In at least one approach, an insert assembly for a vehicle rocker is provided. The insert assembly may include an insert pod and a unitary mounting guide. The insert pod may define a plurality of hollow cells and a guide channel defining a slot region extending through a side wall. The unitary mounting guide may extend through the side wall. The unitary mounting guide may include a side rail portion disposed within the guide channel. The unitary mounting guide may further include a body portion having a plurality of interconnected walls that define at least one hollow cell.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
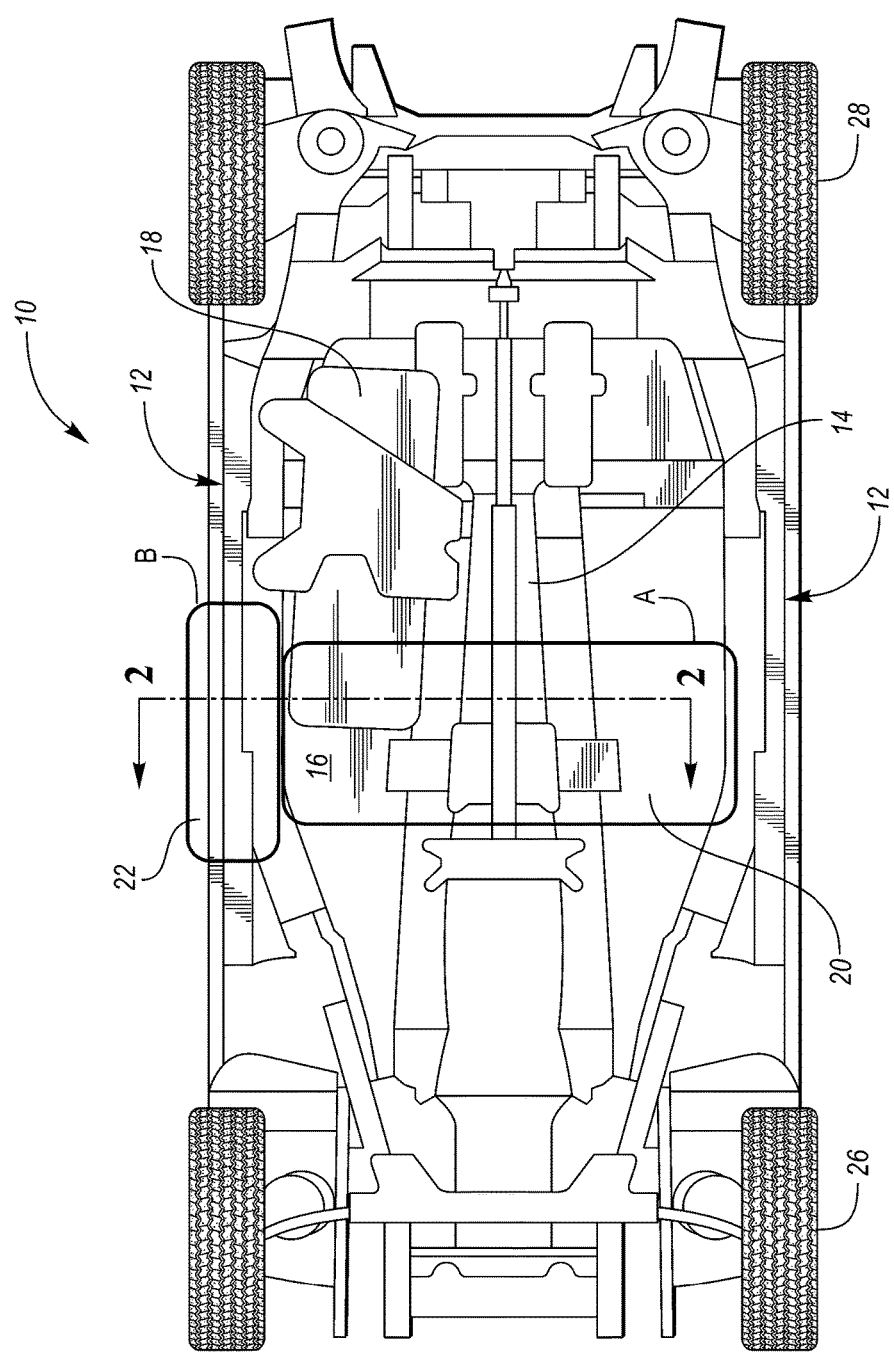
FIG. 1 is a diagrammatic bottom plan view of a vehicle.

Referring to FIG. 1, the underbody of a vehicle 10 is illustrated. A rocker assembly 12, also referred to as an elongated beam, may be disposed on right and left sides of the vehicle 10. In at least one approach, the vehicle 10 may have flat floor. In at least another approach, a central tunnel 14 may extend longitudinally between the rocker assemblies 12 and may form part of the floor pan 16 (of the vehicle 10. The floor pan 16 may underlie a passenger compartment of the vehicle 10. In at least one approach, the vehicle 10 may include a battery 18. The battery 18 may be an underfloor battery. In this way, the battery 18 may be attached below the floor pan 16 by brackets provided by the underbody structure. A protected area box 20 is labelled with the letter "A" and an impact absorbing area box 22 is labelled with the letter "B". The vehicle 10 may have a pair of front wheels 26 and a pair of rear wheels 28. The rocker assembly 12 may extend between the wheel wells of the front wheels 26 and rear wheels 28.

Figure 2:
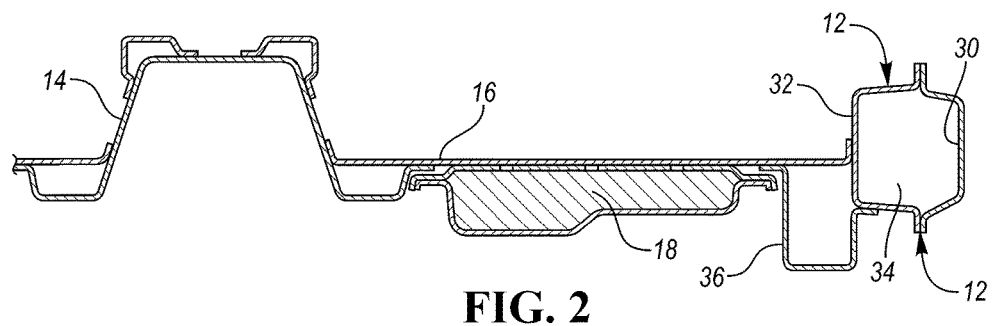
FIG. 2 is a fragmentary transverse cross-section view taken along the line 2-2 in FIG. 1 of a vehicle having a rocker assembly.

Referring to FIG. 2, a vehicle structure is shown to include a rocker assembly 12 on one side of the floor pan 16 and central tunnel 14. The rocker assembly 12 may include an outer rocker panel 30 and a side sill 32 that may be assembled together to define the cavity 34. The underfloor battery 18 is shown secured to the floor pan 16 inboard of a sled runner beam 36 and the rocker assembly 12.

Figure 3:
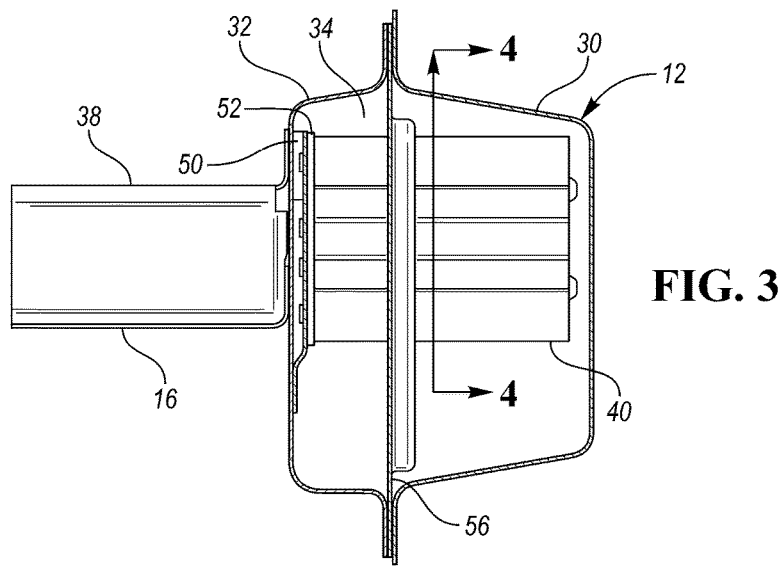
FIG. 3 is a fragmentary transverse cross-section view of a vehicle having a rocker assembly with an insert including a plurality of layers of interconnected cells disposed in the rocker assembly.

Referring to FIG. 3, in at least one approach, a cross member 38 may be disposed above or below the floor pan 16 (e.g., above and a sled runner beam). One or more inserts 40 may be disposed within the cavity 34. The insert 40 may include a plurality of cells that may be polygonal cells. In this way, the insert 40 may define a "honeycomb" structure.

Figure 4:
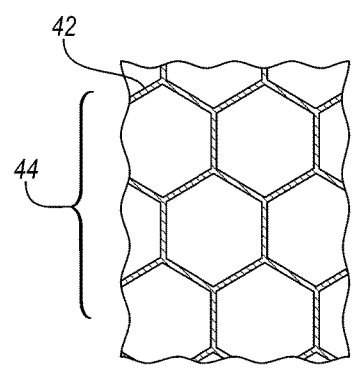
FIG. 4 is a fragmentary cross-section view taken along the line 4-4 in FIG. 3.

Referring to FIG. 4, the inserts 40 may include a plurality of interconnected walls defining a plurality of transversely extending open cells. In this way, a plurality of cells 42 may be generated about a central axis that extends in a transverse vehicle direction. The cells 42 may have shared cell walls that form a cellular network 44. The cells may be hexagonal cells, octagonal cells, square cells, circular cells, or any other suitable combination thereof. The cells may be disposed in regular or irregular arrangement. Wall thickness can also be uniquely specified for tuning of the performance.

Figure 5:
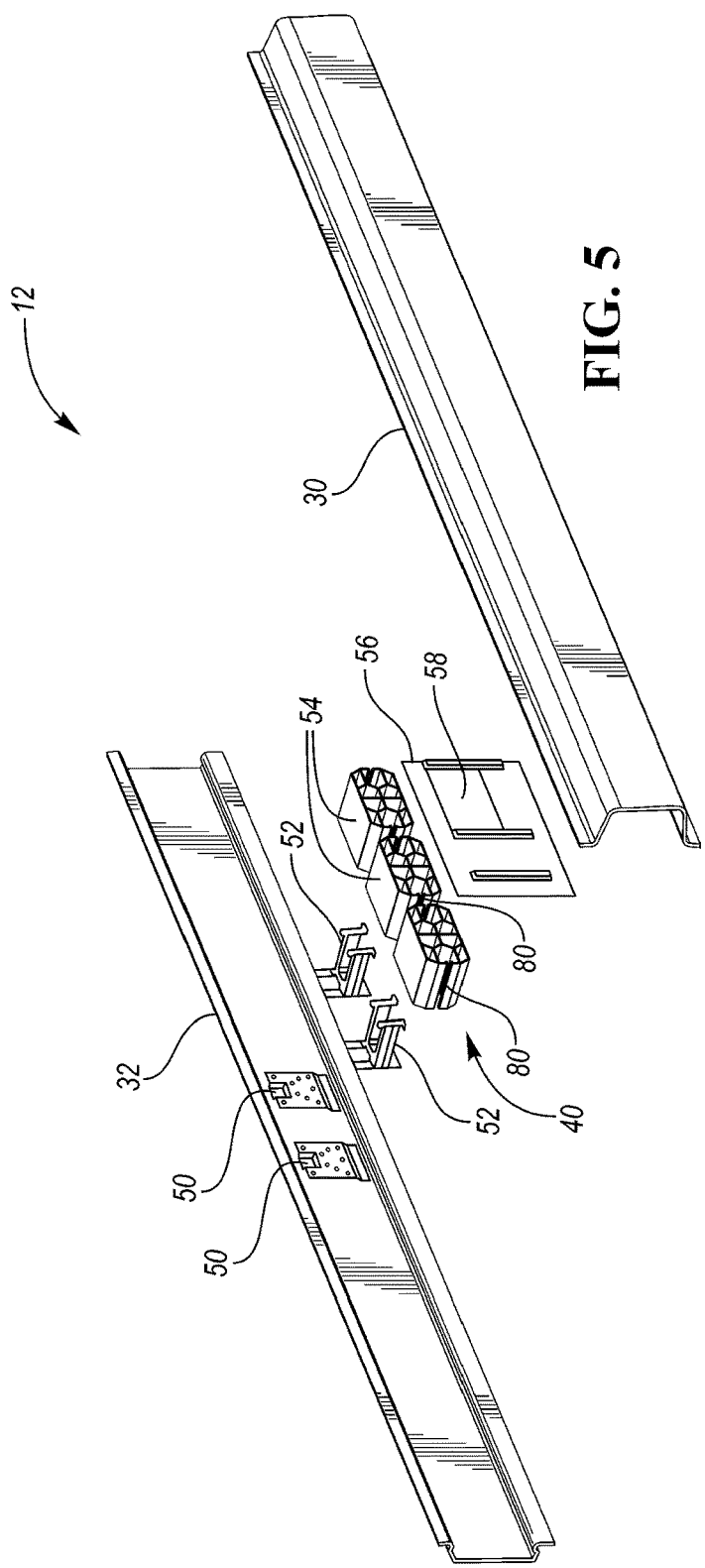
FIG. 5 is an explode view of a rocker assembly.

Referring to FIG. 5, the rocker assembly 12 may include one or more support plates, which may be referred to herein as flanges 50. The flanges 50 may be secured to an internal surface of the side sill 32, as discussed in greater detail elsewhere herein. As used herein, an internal surface of the side sill 32 may refer to a surface facing (e.g., exposed to) the cavity 34. The flanges 50 may be formed of steel or any other suitable material.

The rocker assembly 12 may further include one or more support members, which may be referred to herein as guide rails 52. The guide rails 52 may be secured to the flanges 50, as discussed in greater detail elsewhere herein. The guide rails 52 may be formed of plastic or any other suitable material.

The one or more inserts 40 discussed with respect to FIG. 3 may include a plurality of insert pods 54 (which may correspond to the inserts 40 discussed with respect to FIG. 3). The insert pods 54 may be secured to the guide rails 52, as discussed in greater detail elsewhere herein. The insert pods 54 may be, for example, extruded or molded insert pods. In at least one approach, the insert pods 54 may be formed of aluminum. Guide rails can also provide additional energy absorption between the inserts. The inserts 40 may also be open-ended to allow the free escape of e-coat and/or other corrosion inhibitor fluids that may be used for corrosion protection.

The rocker assembly 12 may further include a pillar plate 56. The pillar plate 56 may be secured to one or both of the outer rocker panel 30 and the side sill 32. The pillar plate 56 may extend within the cavity 34 defined by the outer rocker panel 30 and the side sill 32. The pillar plate 56 may be adapted to support a pillar and may be, for example, a B-pillar plate adapted to support a B-pillar secured to the pillar plate 56. The pillar plate 56 may include inner aperture walls that may define an aperture 58 disposed through the pillar plate 56. As shown, at least a portion of the pillar plate 56 may extend between adjacent side rails.

Figure 6:
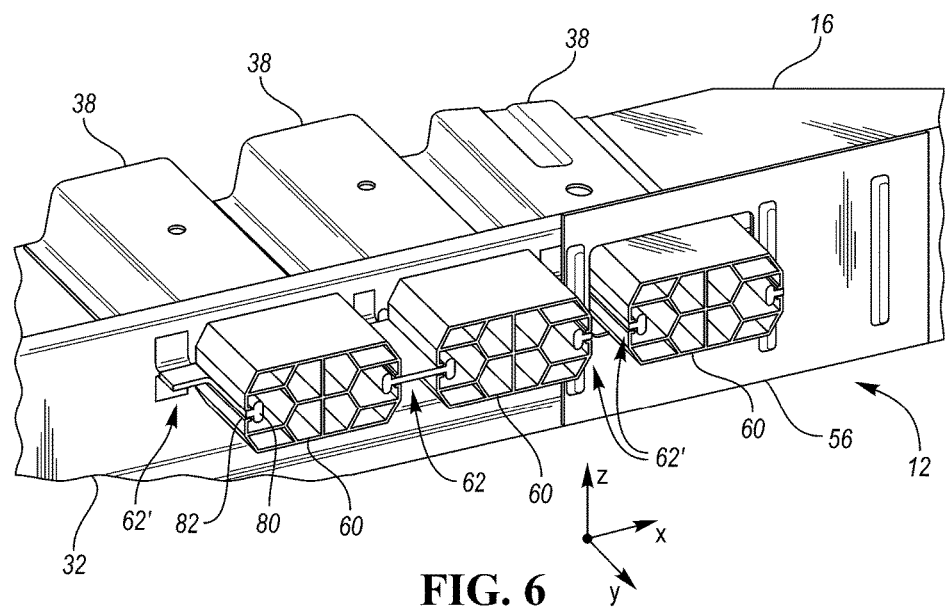
FIG. 6 is a perspective view of a rocker assembly.

Referring to FIG. 6, a vehicle (e.g., the vehicle 10 of FIG. 1) may include a plurality cross members 38 secured to the floor 16. The vehicle may further include a rocker assembly 12 having a plurality of insert pods 60 (which may correspond to the insert pods 54 of FIG. 5). The insert pods 60 may be disposed in alignment with the cross members 38, and as such, the quantity of insert pods 60 may correspond to the quantity of cross members 38. As shown in FIG. 6, three insert pods 60 and three cross members 38 may be provided with individual insert pods 60 disposed in alignment with the three cross members 38. In this way, the insert pods 60 and the cross members 38 may define a load path in a direction parallel to longitudinal axes of the insert pods 60 and the cross members 38 (e.g., transverse to a longitudinal axis of the vehicle). Although shown as having common shapes and dimensions, the insert pods 60 may be varied in shape and/or dimension.

As discrete components, the number and location of the insert pods 60 may be selectively chosen, for example, based on packaging requirements or limitations. A rocker assembly 12 may further be optimized to locate insert pods 60 at longitudinal locations along the rocker assembly 12 at which additional reinforcement may be desirable (e.g., at or near a pillar, or spaced from a pillar).

The insert pods 60 may be secured to side sill 32 through an attachment device. In at least one approach, the attachment device is an attachment assembly 62. The insert pods 60 may be disposed in spaced apart alignment along a longitudinal axis of the side sill 32. For example, perimeter cells of respective adjacent insert pods 60 may define a gap therebetween.

The attachment assemblies 62 may take various shapes. For example, an intermediate attachment assembly 62 disposed in engagement with two adjacent insert pods 60 may have a first shape, while an end attachment assembly 62' disposed in engagement with only one insert pod 60 may have a second shape different than the first shape. Discussion of the attachment assemblies herein may refer to an intermediate attachment assembly 62, an end attachment assembly 62', or both.

Figure 7:
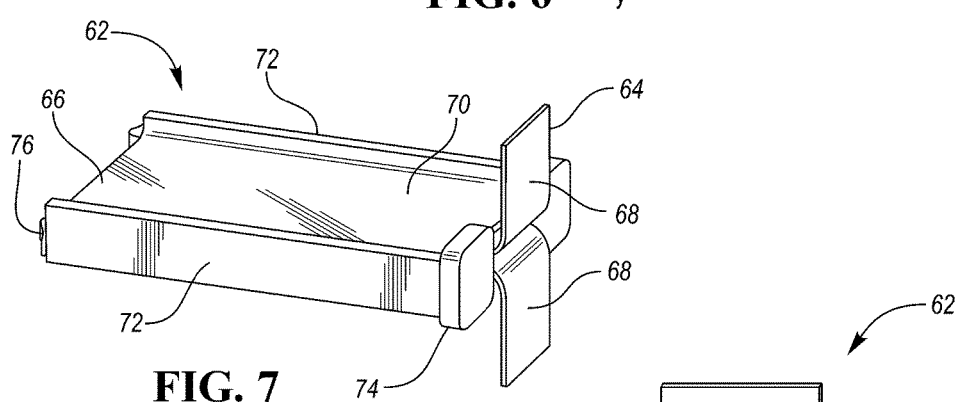
FIG. 7 is a first perspective view of a first attachment assembly of the rocker assembly of FIG. 6.
Figure 8:
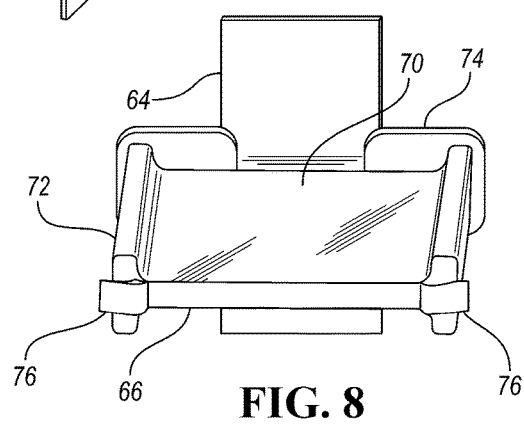
FIG. 8 is a second perspective view of the attachment assembly of FIG. 7.

Referring to FIGS. 7 and 8, an attachment assembly 62 may include one or more mounting plates 64 and one or more mounting guides 66. A mounting plate 64 may define one or more flanges 68 that extend from the mounting guide 66. The flanges 68 may be integrally formed, or may be discretely formed. The flanges 68 may define a securing surface, which may be a planar securing surface. In this way, the flanges 68 may be secured (e.g., welded) to a longitudinal member (e.g., side sill 32) to secure the attachment assembly 62 to the longitudinal member. Although shown in FIG. 6 as secured to the side sill 32, it is expressly contemplated that one or more components of the attachment assembly 62 may be secured to another structure of the vehicle, such as the outer rocker panel 30, in addition to or instead of the side sill 32.

A mounting guide 66 may be referred to as a guide or guide rail. The mounting guide 66 may include a body 70. The body 70 may be secured to a mounting plate 64. In at least one approach, the mounting guide 66 may be secured to the mounting plate 64 through an overmold at the body 70. In this way, at least a portion of the mounting plate 64 may be received within the body 70 of the mounting guide 66. Other suitable approaches for securing the mounting guide 66 to the mounting plate 64 are contemplated.

The body 70 may have a height or thickness corresponding to (e.g., marginally less than) a height of a guide rail aperture that extends through a wall (e.g., side wall) of an insert pod 60. In this way, the body 70 may extend at least partially within a cell (e.g., side cell) of an insert pod 60 to be supported. The body 70 may further engage the insert pod 60 along the guide rail aperture to inhibit movement of the insert pod 60 in a direction corresponding to the Z-axis of FIG. 6.

A mounting guide 66 may further include one or more side rails 72. In at least one approach, the side rails may have a height or thickness that corresponds to a height or thickness of the body 70. In at least another approach, a side rail 72 may extend from the body 70 (e.g., in the Z-direction of FIG. 6) such that the side rail 72 has a height or thickness different (e.g., greater) than a height or thickness of the body 70. The side rail 72 may further have a height or thickness greater than a height of a guide rail aperture that extends through a wall (e.g., side wall) of an insert pod 60. At least a portion of the mounting guide 66 may engage the insert pod 60 at or proximate the guide rail aperture to inhibit movement of the insert pod 60 in a direction corresponding to the X-axis of FIG. 6.

A mounting guide 66 may further include a boss 74. The boss 74 may be disposed at a region of the body 70 proximate the mounting plate 64 (e.g., proximate the flange 68). The boss 74 may have a depth or thickness (e.g., in the Y direction of FIG. 6). In at least one approach, the depth of the boss 74 is sufficient to inhibit the insert pod 60 from contacting an adjacent longitudinal member (e.g., side sill 32). In this way, a clearance (e.g., air gap) may be provided between metal components (e.g., an aluminum crush pod 60 and steel side sill 32). The clearance may be sufficient to inhibit or reduce the potential for corrosion at one or both metal components.

A mounting guide 66 may further include one or more securing features, such as resilient tabs 76. The resilient tabs 76 may be disposed at a peripheral end of the body 70 opposite the boss 74. The resilient tabs 76 may be adapted to flex in response to a biasing force, and to return to an unflexed position in the absence of a biasing force.

With reference to FIGS. 5 and 6, an insert pod 60 may be secured to an attachment assembly 62. For example, an insert pod 60 may be secured to an attachment assembly 62 by disposing an insert pod 60 along a side rail 72 of the attachment assembly 62 though a guide channel 80 of the insert pod 60. The guide channels 80 may be formed by guide channel walls that extend from a slot region 82 formed through a side wall of the insert pod 60. In this way, an insert pod 60 may include two guide channels 80 that may be disposed on opposite sides of the insert pod 60. Furthermore, the guide channels 80 may be accessible through the side walls of the insert pods 60 through the slot region 82. The slot region 82 may be sized to receive a portion of the mounting guide 66 (e.g., a portion of the body 70). The guide channels 80 may be sized to receive a portion of the mounting guide 66 (e.g., rails 72).

The insert pod 60 may be moved (e.g., slid) relative to the attachment assembly 62 such that the side rail 72 slidably passes through the guide channel 80 of the insert pod 60. As the insert pod 60 is moved along the side rail 72, the insert pod 60 may exert a biasing forced on the resilient tabs 76 causing the resilient tabs 76 to flex. When the insert pod 60 is moved a sufficient distance along the side rails 72 (e.g., into engagement with the boss 74), the insert pod 60 may cease to effect the biasing force, and the resilient tabs 76 may be return to an unflexed position. In this position, the boss 74 and the resilient tabs 76 may inhibit movement of the insert pod 60 in directions corresponding to the Y-axis of FIG. 6.

Figure 9:
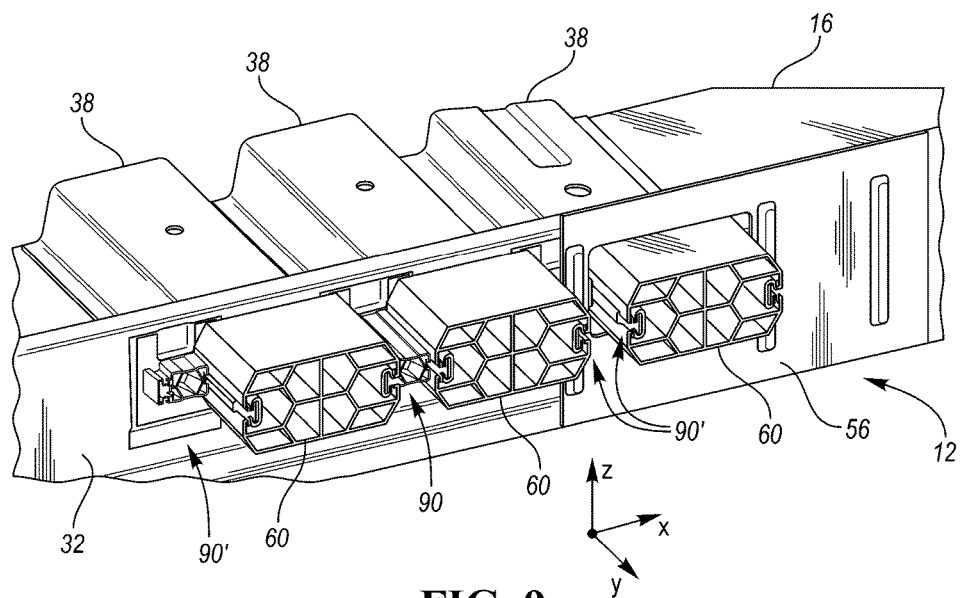
FIG. 9 is a perspective view of a second rocker assembly.
Figure 10:
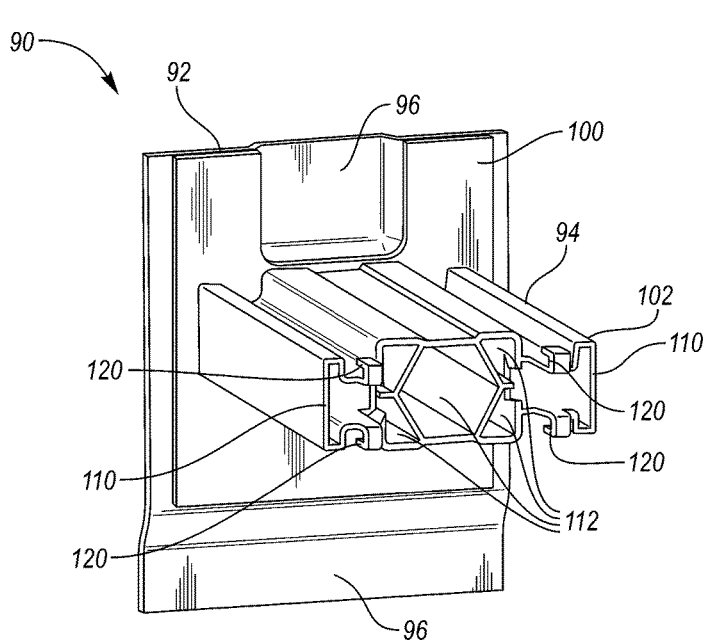
FIG. 10 is a perspective view of an attachment assembly of the rocker assembly of FIG. 9.

Referring to FIGS. 9 and 10, in still another approach, an attachment assembly may form a closed-form attachment assembly 90. The attachment assembly 90 may include one or more mounting plates 92 and one or more guide rails 94. A mounting plate 92 may define one or more planar regions 96 disposed in engagement with an adjacent longitudinal member (e.g., side sill 32), and one or more offset regions 98 at which the guide rails 94 may be secured. The planar regions 96 and offset regions may be integrally formed, or may be discretely formed. The planar regions 96 may define securing surfaces. In this way, the planar regions 96 may be secured (e.g., welded) to a longitudinal member (e.g., side sill 32) to secure the attachment assembly 90 to the longitudinal member. Although shown in FIG. 10 as secured to the side sill 32, it is expressly contemplated that one or more components of the attachment assembly 90 may be secured to another structure of the vehicle, such as the outer rocker panel 30, in addition to or instead of the side sill 32.

A guide rail 94 may include a base 100 and a body 102. The body 102 may be secured to a mounting plate 92. In at least one approach, the guide rail 94 may be integrally formed with the mounting plate 92. In still another approach, the guide rail 94 may be a discrete component and may be secured to the mounting plate 92 through any suitable approach.

The base 100 may be adapted to space an insert pod 60 apart from the mounting plate 92. In this way, the base 100 may be referred to as a boss, and may similar to boss 74 discussed with respect to FIGS. 7 and 8.

The body 102 may define guide rails 110. The body 102 may further define one or more closed-formed structures 112 that may be defined by wall structures including, for example, internally-formed wall structures. In this way, body 102 may include a plurality of interconnected walls defining at least one transversely extending open cell.

A guide rail 94 may further include one or more securing features, such as resilient tabs 120. The resilient tabs 120 may include opposing pairs of resilient tabs 120 that may, for example, be face in opposite directions. The resilient tabs 120 may be adapted to flex in response to a biasing force, and to return to an unflexed position in the absence of a biasing force.

In at least one approach, an insert pod 60 may be secured to an attachment assembly 90. For example, an insert pod 60 may be secured to an attachment assembly 90 by disposing an insert pod 60 along a guide rail 110 of the attachment assembly 90. The insert pod 60 may be moved (e.g., slid) relative to the attachment assembly 62 such that the guide rails 110 slidably pass through the guide channel 80 of the insert pod 60. As the insert pod 60 is moved along the guide rail 110, the insert pod 60 may exert a biasing forced on the resilient tabs 120 causing the resilient tabs 120 to flex. When the insert pod 60 is moved a sufficient distance along the guide rails 110, the insert pod 60 may cease to effect the biasing force, and the resilient tabs 120 may be return to an unflexed position. In this position, the resilient tabs 120 may inhibit movement of the insert pod 60 in directions corresponding to the Y-axis of FIG. 9.

The insert pods and attachment assemblies discussed herein may provide improved crash impact absorbance. For example, in addition to the insert pods, the attachment assemblies may also provide impact absorbance. This may be particularly beneficial in locations of the vehicle in which an insert pod is not (or cannot be) located. As discussed, the insert pods may be aluminum pods and can be manufactured by extrusion or by molding. Extrusion may be followed by trimming or laser cutting (e.g., slots required for a coating to drip). The attachment assemblies may include components formed of different materials. For example, plastics or composites parts can be overmolded to steel flanges or directly overmolded to aluminum pods or overmolded to both. Where plastic/composites are overmolded to steel, snap-fit mechanisms on the plastic/composite components may be used to retain the insert pod. The snap-fit mechanism may include a guide rail and snaps at the end of the guide rail. The guide rail may constraint the motion of the insert pods pods in X and Z directions. The snaps may constraint the motion of the insert pods in the Y direction, and as such, may prevent the insert pods from sliding out.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A rocker assembly for a vehicle comprising:
   an outer panel;
   a side sill secured to the outer panel and defining a cavity with the outer panel;
   an attachment assembly including a mounting plate secured to the side sill and a mounting guide secured to the mounting plate, the mount guide including a side rail that extends within the cavity; and
   an insert pod disposed within the cavity and secured to the attachment assembly, the insert pod including a plurality of interconnected walls defining a plurality of transversely extending open cells, the insert pod further including a slot region extending through a side wall and sized to receive a portion of the mounting guide, the insert pod further including guide channels walls extending from the side wall and defining a guide channel sized to receive the side rail therein.

2. The rocker assembly of claim 1 wherein the mounting guide further includes a resilient tab disposed at an end of a side rail opposite the mounting plate, and wherein the resilient tab engages the insert pod to inhibit movement of the insert pod away from the side sill.

3. The rocker assembly of claim 1 wherein the attachment assembly is a first attachment assembly including a first side rail disposed within a first guide channel of a first insert pod, a second side disposed within a second guide channel of a second insert pod, and a body portion extending between the first and second side rails;
   wherein the rocker assembly further includes a second attachment assembly having a third guide channel disposed within a third guide channel of the first insert pod.

4. The rocker assembly of claim 1 wherein the mounting guide includes a first side rail disposed within a first guide channel of a first insert pod, a second side disposed within a second guide channel of a second insert pod, and a body portion extending between the first and second side rails to space the first insert pod from the second insert pod.

5. The rocker assembly of claim 4 wherein the body portion is a generally planar body portion having a thickness less than a thickness of the first and second side rails.

6. The rocker assembly of claim 4 wherein the body portion includes a plurality of interconnected walls defining at least one transversely extending open cell.

7. The rocker assembly of claim 1 further comprising:
   a pillar plate secured to the side sill and defining an aperture through the pillar plate, wherein the mounting guide and the insert pod extend through the aperture.

8. The rocker assembly of claim 7, wherein at least a portion of the pillar plate extends between adjacent side rails.

9. The rocker assembly of claim 1 wherein the mounting guide includes a boss disposed at a first end of the mounting guide between the insert pod and the side sill to space the insert pod from the side sill.

10. The rocker assembly of claim 1 wherein the mounting plate is a metal mounting plate that is welded to the side sill, and wherein the mounting guide is a plastic mounting guide overmolded to the steel mounting plate.

11. An insert assembly for a vehicle rocker comprising:
    an insert pod defining a plurality of hollow cells and a guide channel defining a slot region extending through a side wall;
    a mounting guide defining a body extending into the slot region and a side rail disposed within the guide channel; and
    a mounting plate defining a plurality of metallic flanges extending generally orthogonally from the body.

12. The insert assembly of claim 11 wherein the side rail has a thickness greater than the body and engages walls of the guide channel to inhibit movement of the insert pod in at least a first direction.

13. The insert assembly of claim 12 wherein the mounting guide further includes at least one resilient tab disposed at an end of the side rail opposite the mounting plate, and wherein the resilient tab engages the insert pod to inhibit movement of the insert pod in a second direction orthogonal to the first direction.

14. The insert assembly of claim 11 wherein the mounting guide is formed of a first material, and wherein the mounting plate is formed of a second material different than the first material.

15. The insert assembly of claim 14 wherein the first material is a plastic and wherein the second material is a metal or metal alloy.

16. The insert assembly of claim 15 wherein the body of the mounting guide is overmolded to the mounting plate.

17. An insert assembly for a vehicle rocker comprising:
    an insert pod defining a plurality of hollow cells and a guide channel defining a slot region extending through a side wall; and
    a unitary mounting guide extending through the side wall and including
        a side rail portion disposed within the guide channel, and
        a body portion having a plurality of interconnected walls that define at least one hollow cell.

18. The insert assembly of claim 17 wherein the body portion defines a central hollow cell and a plurality of peripheral hollow cells adjacent the central hollow cell.

19. The insert assembly of claim 17 wherein the unitary mounting guide further includes a mounting base extending in a plane generally orthogonal to a central axis of the at least one hollow cell.

20. The insert assembly of claim 19 wherein the unitary mounting guide is formed of a first material, wherein the insert assembly further includes a mounting plate formed of a second material, wherein the mounting plate extends in a plane generally parallel to the mounting base, and wherein the mounting guide is overmolded to the mounting plate.

* * * * *